E. B. BOWERS.
TRUCK.
APPLICATION FILED JUNE 25, 1908.

918,819.

Patented Apr. 20, 1909.

WITNESSES:
Harry King
M. A. Jones

INVENTOR
Bose B. Bowers
BY
his ATTORNEYS.

THE NORRIS PETERS CO., WASHINGTON, D. C.

UNITED STATES PATENT OFFICE.

BOSE B. BOWERS, OF MACON, GEORGIA.

TRUCK.

No. 918,819.   Specification of Letters Patent.   Patented April 20, 1909.

Application filed June 25, 1908.   Serial No. 440,395.

*To all whom it may concern:*

Be it known that I, BOSE B. BOWERS, a citizen of the United States, residing at Macon, in the county of Bibb and State of Georgia, have invented certain new and useful Improvements in Trucks; and I do hereby declare the following to be a full, clear, and exact description of the invention, such as will enable other skilled in the art to which it appertains to make and use the same.

The truck which is the subject of this invention was designed more especially for use in cotton mills for transporting bobbin-spools, yarn and other articles, but is of course adapted for general purposes in various establishments, as stores, factories, etc.

One feature of the invention resides in the combination with a freely-castering truck of a box-body mounted thereon having rounded ends, whereby on striking or colliding with any machinery or other object the truck will naturally and suddenly change its course and glance off, thus materially diminishing the shock and avoiding injury as well to the machinery or other object encountered as to the truck-body.

Another feature of the invention is the construction of the truck-body with a removable box or section which sets securely in place but can be lifted off and deposited whenever desired, thus enabling the operator to set down a full or loaded box, replace it by a similar box and return for another load without waiting for removal of the articles.

Another feature resides in the construction of the truck proper in a truss-like form whereby it can be made of much lighter material to give the requisite strength and accordingly reduce the weight as well as the cost of construction.

The invention will be hereinafter described by reference to the accompanying drawings and then more particularly pointed out in the appended claims.

Figure 1:
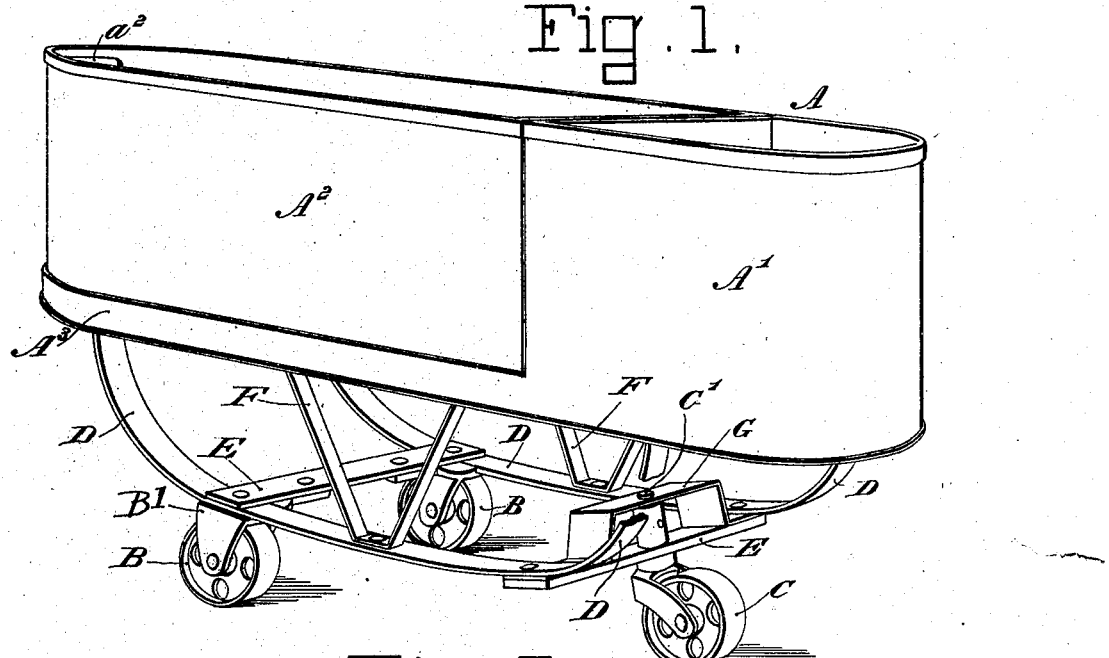
Figure 2:
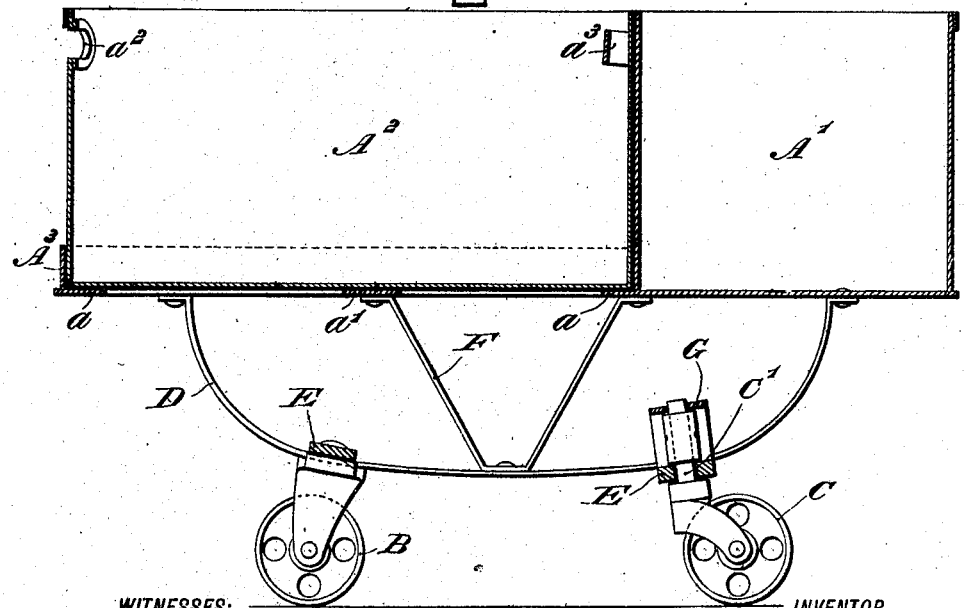

In said drawings, which are to be taken as a part of this specification: Figure 1 is a perspective view of a truck embodying the invention. Fig. 2 is a longitudinal central vertical section thereof.

While the drawings illustrate a preferred embodiment of the invention, it will be understood of course that the invention may be embodied in other forms and that I do not desire to be restricted to the specific details of construction disclosed.

As shown in the drawings, a three-wheeled truck supports a relatively long box-body A. This body is shown having two sections or boxes $A^1$ and $A^2$ of unequal sizes. The smaller box $A^1$ is intended for the empty bobbin-spools and the larger one $A^2$ for the full spools. It is estimated that it requires about twice as much space to carry a given quantity of filled spools as it does for the same number of empty spools. Truck-bodies unequally divided in this fashion are commonly used in cotton mills.

The twin wheels B B are set well under the truck-body, desirably about one-third the distance from the rear end, so as to sustain the bulk or greater part of the weight of the load and yet avoid any tendency to tilt in loading. The third wheel C is set centrally under the body at preferably about the same distance from the front end. This front wheel is a caster-wheel, enabling the truck to be easily turned.

It is noted that the ends of the body A are rounded, eliminating angles or corners, so that should the truck-body collide with or strike against any fixed object it will naturally glance off and instantly change the course of travel of the three-wheeled truck which will respond readily to any slight deflecting force by reason of the front caster-wheel C. This materially diminishes the force of the shock and avoids severe blows with consequent injury to the truck-body and mill-equipment, dispensing with the need of providing the truck-body with buffers, rollers or other devices for diminishing or warding off blows. This same principle may be advantageously applied to a four-wheeled truck such as exhibited in my prior U. S. Patent No. 849,527, dated April 9, 1907, wherein the wheels are disposed two at the center and one at each end and arranged so that the truck will rock or tilt on the two center wheels, thus enabling it to turn readily. However, the three-wheeled truck is preferred.

The truck-box or body A overhangs or projects beyond the truck proper on all sides, so that, in the case of wheeling the truck past a spinning frame, for example, there would be no liability of the truck proper encountering any of the parts projecting below the step-rail of the spinning machine, since the body A would first engage and glance off from or ride easily along the step-rail and hold off the truck.

As shown, the larger box $A^2$ is a separate and removable section of the body and sets within a flanged base portion A³, the sides and bottom of the smaller section A¹ being continued to provide said base A³ though the bottom of the latter is preferably cut away under the removable box A² leaving only a marginal portion $a$ and a cross-strip $a^1$. Handles $a^2$ and $a^3$ are shown in the ends of the removable box A² for convenience in lifting it. By this construction, the truckman or operator, when handling certain classes of goods, can take the truck to the desired place, deposit the loaded tray, replace it by another empty box and immediately return for another load; or he may exchange a box filled with one class of goods for another box containing other articles.

The invention also comprehends the construction of both boxes or compartments of the body as separable sections; or the construction of the entire body as a removable box to set within a flanged base portion.

The body is preferably though not essentially made of light sheet-metal. For a truck for use in dry goods stores the body may advantageously be made of woven wire sides on a sheet iron bottom; say the base portion A³ and a corresponding height of the section A¹ being of sheet-iron and the box A² and remainder of box A¹ of woven wire.

The truck proper is in the form of a truss, comprising opposite downwardly-curved or bowed side-bars D, D, connected by the cross-bars E to which the wheel-standards are attached. The ends of the curved bars D are secured to the bottom of the body A, the rear ends being secured to the inner marginal portion $a$ of the base A³ in which sets the removable box A². The bowed or curved side-bars are also medially braced and connected to the body by saddle brackets F in the form of substantially V-shaped strips or bars having their upper ends secured to the bottom of the body A. This truss-like form of truck is very efficient and strong, and allows much lighter material to be used while yet giving the requisite strength. The bowed side-bars D are integral, yet their end portions have the requisite upward inclination to support the body at the proper elevation.

The front caster-wheel C is shown journaled in the bifurcated foot of a vertically-disposed spindle C¹ which is pivotally or revolubly mounted on the front cross-bar E and a yoke-shaped member G attached on said bar. The rear wheels B are journaled in brackets or standards B¹ attached to the rear cross-bar E, preferably under the respective side-bars D.

I claim:

1. A three-wheeled truck arranged with a pair of rear wheels and a central front caster-wheel, and a box-body mounted thereon overlying the sides of the truck and formed in plan with rounded ends respectively beyond the said rear and front supporting wheels, substantially as and for the purpose set forth.

2. A truck comprising opposite side-bars mounted on supporting wheels and having upwardly-inclined portions extending beyond the wheels at both ends, and a box-body overlying the truck on all sides and formed in plan with rounded ends, substantially as and for the purpose described.

3. In a truck, a box-body constructed with a box at one end and a flanged base extending therefrom and a removable box setting in said flanged base portion.

4. A truck of truss-like form comprising downwardly-curved or bowed side-bars, cross-bars connecting the same, saddle-brackets mounted medially on said side-bars, and a body mounted on the ends of said side-bars and on said saddle-brackets.

In testimony whereof I affix my signature, in presence of two witnesses.

BOSE B. BOWERS.

Witnesses:
 CHAS. D. S. CORK,
 OLIVER ORR.